United States Patent Office.

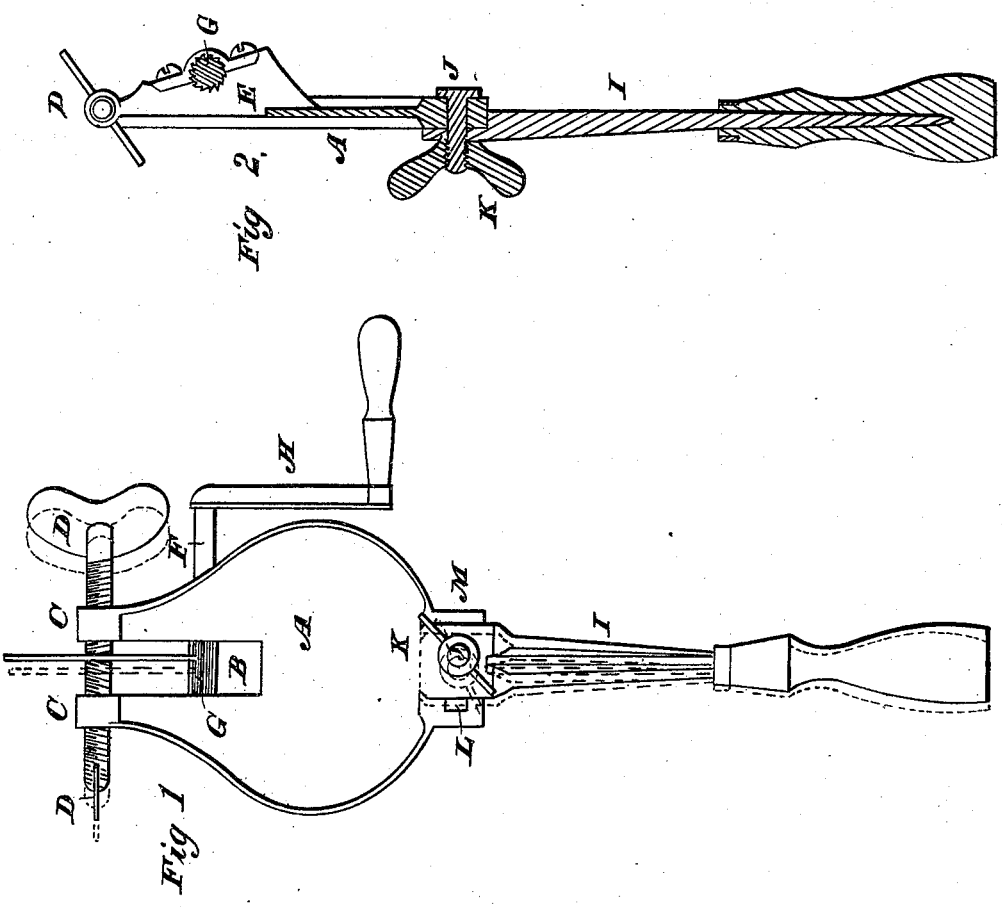
J. E. Emerson,
Saw-Gummer,
No. 62,948. Patented Mar. 19, 1867.
WITNESSES:
Geo W Rothwell
J L Ewing
INVENTOR:
J. E. Emerson

JAMES E. EMERSON, OF TRENTON, NEW JERSEY.

Letters Patent No. 62,948, dated March 19, 1867.

---

IMPROVEMENT IN SAW-GUMMING MACHINES.

---

The Schedule referred to in these Letters Patent and making part of the same.

---

TO ALL WHOM IT MAY CONCERN:

Be it known that I, JAMES E. EMERSON, of Trenton, in the county of Mercer, and State of New Jersey, have invented certain new and useful Improvements in Saw-Gummers; and I do hereby declare the following to be a full, clear, and exact description of the nature, construction, and operation of the same, sufficient to enable those skilled in the art to which my invention appertains to fully understand and use the same, reference being had to the accompanying drawings, forming part of this specification, and in which—

Figure 1 is a top view.

Figure 2 is a longitudinal section.

The nature of my invention consists, first, in providing a more simple, convenient, and effective means for forming and repairing the teeth of saws than has been heretofore used, by so constructing and arranging the several parts of a saw-gummer that the thumb-screws employed to clamp the tool upon the saw-plate will constitute pivots upon which it turns, and afford means for shifting the frame, so as to bring a new part of the cutter into action as often as needful, and readily removing the machine from one point to another on the circumference of the saw under operation; second, in the employment of an adjustable handle, by means of which the pressure may be always applied in the plane of resistance. In the drawings—

A is the body of the machine, made by preference of cast iron. Any suitable metal may, however, be employed. Extending half the length, from front to rear, of the body A is a rectangular slot, B. At the forward extremities of its opposite sides are formed lugs C C, bored transversely for the admission of the thumb-screws D D. On the under or lower side of the body A lugs or projections E E are formed, rising at the opposite sides of the slot B, into which a shaft, F, is journalled, bearing the burr or cutter G, working transversely in the slot B. Motion is communicated to the shaft F by means of a crank and handle, H, fitted to said shaft by a screw. Extending outwardly from the rear of the body A is a handle, I, made adjustable by means of the screw J below, and thumb-nut K above, in the transverse slot L, formed in a projection, M, of the body A.

Operation.

I should here state that my machine is for gumming or milling out the throats of all kinds of saw-teeth. If movable teeth are to be gummed, they remain in the saw-plate while under treatment. The saw being secured from turning, the gummer is applied by grasping the saw-plate between the thumb-screws D D, which serve separately as clamps, and together form a pivot, upon which the gummer is turned while in operation. Commence using one end of the cutter. Move the thumb-screws and handle so that the pressure will be opposite the cutting part. The ridge N on the handle I forms a convenient guide for such adjustment. The cutter G is guided and firmly pressed against the edge of the saw-plate during the operation by means of the handle or lever I held by one hand, while the crank H is revolved by the other, thus giving motion to the cutter G. To shift the gummer in relation to the saw, in order to bring a new part of the cutter into operation, the thumb-screws D D are turned, one forward, the other backward. Care should be taken that the centre of the handle I is always in line with the edge of the saw-plate.

Having thus described my invention, the following is what I claim as new, and desire to secure by Letters Patent:

1. The thumb-screws D D, arranged and operating as pivots, substantially as and for the purpose specified.

2. The combination of the thumb-screws D D and adjustable handle I, for exerting the pressure directly in line with the cutting part, substantially as described and represented.

J. E. EMERSON.

Witnesses:
GEO. W. ROTHWELL,
J. S. EWIN.